US012144079B2

(12) United States Patent
Lu et al.

(10) Patent No.: US 12,144,079 B2
(45) Date of Patent: Nov. 12, 2024

(54) LIGHTING DEVICE HAVING ANTI-INTERFERENCE LIGHT CONTROL CIRCUIT

(71) Applicant: Xiamen PVTECH Co., Ltd., Fujian (CN)

(72) Inventors: Fuxing Lu, Fujian (CN); Guohua Zhou, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 125 days.

(21) Appl. No.: 18/127,635

(22) Filed: Mar. 28, 2023

(65) Prior Publication Data

US 2024/0244727 A1 Jul. 18, 2024

(30) Foreign Application Priority Data

Jan. 16, 2023 (CN) ......................... 202310068003.8

(51) Int. Cl.
*H05B 45/3725* (2020.01)
*H05B 45/59* (2022.01)

(52) U.S. Cl.
CPC ......... *H05B 45/3725* (2020.01); *H05B 45/59* (2022.01)

(58) Field of Classification Search
CPC .... H05B 45/3725; H05B 45/59; H05B 47/11; H05B 45/12
USPC .......................................................... 315/291
See application file for complete search history.

(56) References Cited

U.S. PATENT DOCUMENTS 5,508,569 A * 4/1996 Nishino ................ H02J 7/0045 361/171
11,832,359 B1 * 11/2023 Lu ............................ F21S 4/28
2024/0244727 A1 * 7/2024 Lu ...................... H05B 45/3725
2024/0244728 A1 * 7/2024 Lu ........................ H05B 47/115

* cited by examiner

*Primary Examiner* — Ryan Jager
(74) *Attorney, Agent, or Firm* — Winston Hsu

(57) ABSTRACT

A lighting device includes a photosensitive element, a first pull-up resistor, a light source driver, a current-limiting detecting resistor, a controller and a pull-up resistance adjusting circuit. The two ends of the photosensitive element are respectively connected to a first node and a grounding point. The two ends of the first pull-up resistor are respectively connected to the first node and a second node (connected to an operating voltage source). The detecting signal input end of the controller is connected to the first node via the current-limiting detecting resistor. The voltage input end of the controller is connected to the second node. The driving signal output end of the controller is connected to the light source driver. The first end, second end and third end of the pull-up resistance adjusting circuit are respectively connected to the first node, second node and control signal output end.

10 Claims, 5 Drawing Sheets

LIGHTING DEVICE HAVING ANTI-INTERFERENCE LIGHT CONTROL CIRCUIT

BACKGROUND OF THE INVENTION

1. Field of the Invention

The present invention relates to a lighting device, in particular to a lighting device having anti-interference light control circuit.

2. Description of the Prior Art

The light control circuit of currently available lighting devices is composed of a photosensitive component (such as a photoresistor, photodiode, etc.), pull-up circuit, and pull-down circuit. The microcontroller unit (MCU) detects the potential of the photosensitive component to control the light source driver in order to control the output of the light source (such as an LED).

However, these lighting devices still have many shortcomings that need to be improved. For example, if the light emitted by the light source is directly irradiated onto the photosensitive component, self-interference may be occurred, which causes the light emitted by the light source to flicker abnormally or reduce the brightness of the light source. In addition, when several lighting devices are turned on at the same time and the photosensitive component of one of the lighting devices is illuminated by the light source of another lighting device, self-interference may be also incurred, which influences the application range of these lighting devices.

SUMMARY OF THE INVENTION

One embodiment of the present invention provides a lighting device having anti-interference light control circuit, which includes a photosensitive element, a first pull-up resistor, a light source driver, a current-limiting detecting resistor, a controller and a pull-up resistance adjusting circuit. One end of the photosensitive element is connected to a first node and the other end thereof is connected to a grounding point. One end of the first pull-up resistor is connected to the first node and the other end thereof is connected to a second node, and the second node is connected to an operating voltage source. The controller has a detecting signal input end, a voltage input end, a driving signal output end and a control signal output end. The detecting signal input end is connected to the first node via the current-limiting detecting resistor. The voltage input end is connected to the second node. The driving signal output end is connected to the light source driver. The first end of the pull-up resistance adjusting circuit is connected to the first node, the second end thereof is connected to the second node, and a third end thereof is connected to the control signal output end.

In one embodiment, the detecting signal input end receives a detecting signal. The driving signal output end outputs a driving signal. The control signal output end outputs a control signal. The level state of the driving signal is equal to the level state of the detecting signal and is contrary to the level state of the control signal.

In one embodiment, the pull-up resistance adjusting circuit includes a second pull-up resistor, a third pull-up resistor, a driving control current-limiting resistor and a switch. The first end of the switch is connected to the first node via the second pull-up resistor. The second end of the switch is connected to the second node. The third end of the switch is connected to the control signal output end and the second node via the driving control current-limiting resistor and the third pull-up resistor.

In one embodiment, the switch is a bipolar junction transistor or a metal-oxide-semiconductor field-effect transistor.

In one embodiment, the first pull-up resistor and the second pull-up resistor are connected to each other in parallel.

In one embodiment, the first pull-up resistor and the second pull-up resistor are not connected to each other in parallel.

In one embodiment, the controller further has a grounding end connected to the grounding point.

In one embodiment, the controller is a micro-controller unit, a central-processing unit, an application specific integrated circuit and a field programmable gate array.

In one embodiment, the light source driver comprises a light source and a driving circuit.

In one embodiment, the light source is a light-emitting diode.

The lighting device having anti-interference light control circuit in accordance with the embodiments of the present invention may have the following advantages:

(1) In one embodiment of the present invention, the lighting device has a pull-up resistance adjusting circuit connected to a controller, a first pull-up resistor, a photosensitive element and a current-limiting detecting resistor, which provides a special pull-up resistance adjusting mechanism. Thus, the light control circuit including the photosensitive element has the pull-up resistance adjusting function, which can effectively reduce the interference due to the change of the ambient light and prevent from self-interference. The above pull-up resistance adjusting mechanism can effectively avoid that the lighting device abnormally flickers or the brightness of the lighting device decreases, such that the performance of the lighting device can be optimized.

(2) In one embodiment of the present invention, the lighting device has the pull-up resistance adjusting circuit, which can provide the special pull-up resistance adjusting mechanism. Besides, the controller can further provide a time delay control mechanism. The combination of the pull-up resistance adjusting mechanism and the time delay control mechanism can effectively decrease the interference caused by the instant dramatic intensity change of the ambient light. Therefore, the lighting device can stably output light, such that the performance of the lighting device can be significantly enhanced. Accordingly, the lighting device can conform to actual requirements.

(3) In one embodiment of the present invention, the lighting device can effectively integrate the above pull-up resistance adjusting mechanism and time delay control mechanism. Thus, the lighting device can effectively decrease the interference caused by the instant dramatic intensity change of the ambient light. Accordingly, the lighting device can provide stable light output, such that the performance of the lighting device can be significantly improved. As a result, the lighting device can satisfy actual requirements.

(4) In one embodiment of the present invention, the pull-up resistance adjusting mechanism and time delay control mechanism of the lighting device can be applied to various currently available lighting devices having the light control function so as to control to the requirements of different environments. Thus, the lighting device can definitely meet the requirements of different applications.

(5) In one embodiment of the present invention, the light control circuit of the lighting device can achieve the aforementioned pull-up resistance adjusting mechanism and time delay control mechanism via a simple circuit design. Thus, the lighting device can achieve the desired technical effects without significantly increasing the cost thereof. Thus, the market competitiveness of the lighting device can be greatly enhanced, such that the lighting device can have high commercial value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
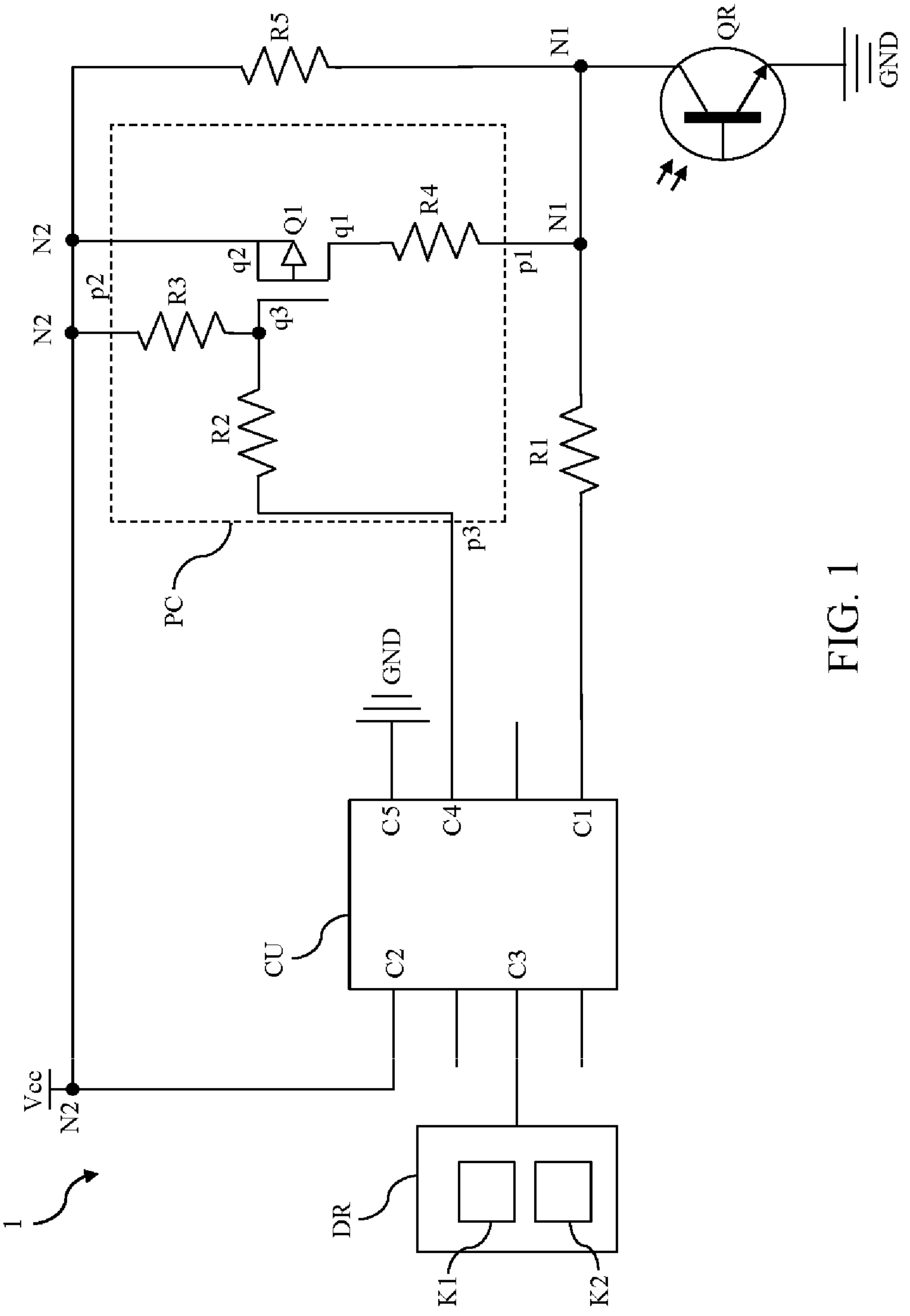
FIG. 1 is a circuit diagram of a lighting device having anti-interference circuit in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a circuit diagram of a lighting device having anti-interference circuit in accordance with one embodiment of the present invention. As shown in FIG. 1, the lighting device 1 includes a photosensitive element QR, a first pull-up resistor R5, a light source driver DR, a current-limiting detecting resistor R1, a controller CU and a pull-up resistance adjusting circuit PC.

One end of the photosensitive element QR is connected to a first node N1 and the other end of the photosensitive element QR is connected to a grounding point GND. In one embodiment, the photosensitive element QR may be a photoresistor, a photodiode or other similar components.

One end of the first pull-up resistor R5 is connected to the first node N1 and the other end of the first pull-up resistor R5 is connected to a second node N2. The second node N2 is connected to an operating voltage source Vcc.

The controller CU has a detecting signal input end C1, a voltage input end C2, a driving signal output end C3, a control signal output end C4 and a grounding end C5. In one embodiment, the controller CU is a micro-controller unit (MCU), a central-processing unit (CPU), an application specific integrated circuit (ASIC) and a field programmable gate array (FPGA). The detecting signal input end C1 is connected to the first node N1 via the current-limiting detecting resistor R1. The voltage input end C2 is connected to the second node N2. The driving signal output end C3 is connected to the light source driver DR.

The first end p1 of the pull-up resistance adjusting circuit PC is connected to the first node N1. The second end p2 of the pull-up resistance adjusting circuit PC is connected to the second node N2. The third end p3 of the pull-up resistance adjusting circuit PC is connected to the control signal output end C4. The grounding end C5 of the pull-up resistance adjusting circuit PC is connected to the grounding point GND. The pull-up resistance adjusting circuit PC includes a second pull-up resistor R4, a third pull-up resistor R3, a driving control current-limiting resistor R2 and a switch Q1. The first end q1 of the switch Q1 is connected to the first node N1 via the second pull-up resistor R4. The second end q2 of the switch Q1 is connected to the second node N2. The third end q3 of the switch Q1 is connected to the control signal output end C4 and the second node N2 via the driving control current-limiting resistor R2 and the third pull-up resistor R3 respectively. In one embodiment, the switch Q1 may be a bipolar junction transistor (BJT), a metal-oxide-semiconductor field-effect transistor (MOSFET) or other similar components. In this embodiment, the switch Q1 may be a PMOS and the drain (the first end q1) of the switch Q1 is connected to the first node N1 via the second pull-up resistor R4. The source (the second end q2) of the switch Q1 is connected to the second node N2. The gate (the third end q3) of the switch Q1 is connected to the control signal output end C4 and the second node N2 via the driving control current-limiting resistor R2 and the third pull-up resistor R3 respectively.

The light source driver DR includes a light source K1 and a driving circuit K2. Besides, the light source driver DR may further include a power supply, a converter, a filter or other similar functional circuits. In this embodiment, the light source K1 may be a light-emitting diode (LED). In another embodiment, the light source K1 may be a fluorescent lamp or other similar components. The circuit structure and functions of the light source driver DR are known by those skilled in the art, so will not be described therein again.

The embodiment just exemplifies the present invention and is not intended to limit the scope of the present invention; any equivalent modification and variation according to the spirit of the present invention is to be also included within the scope of the following claims and their equivalents.

Figure 2:
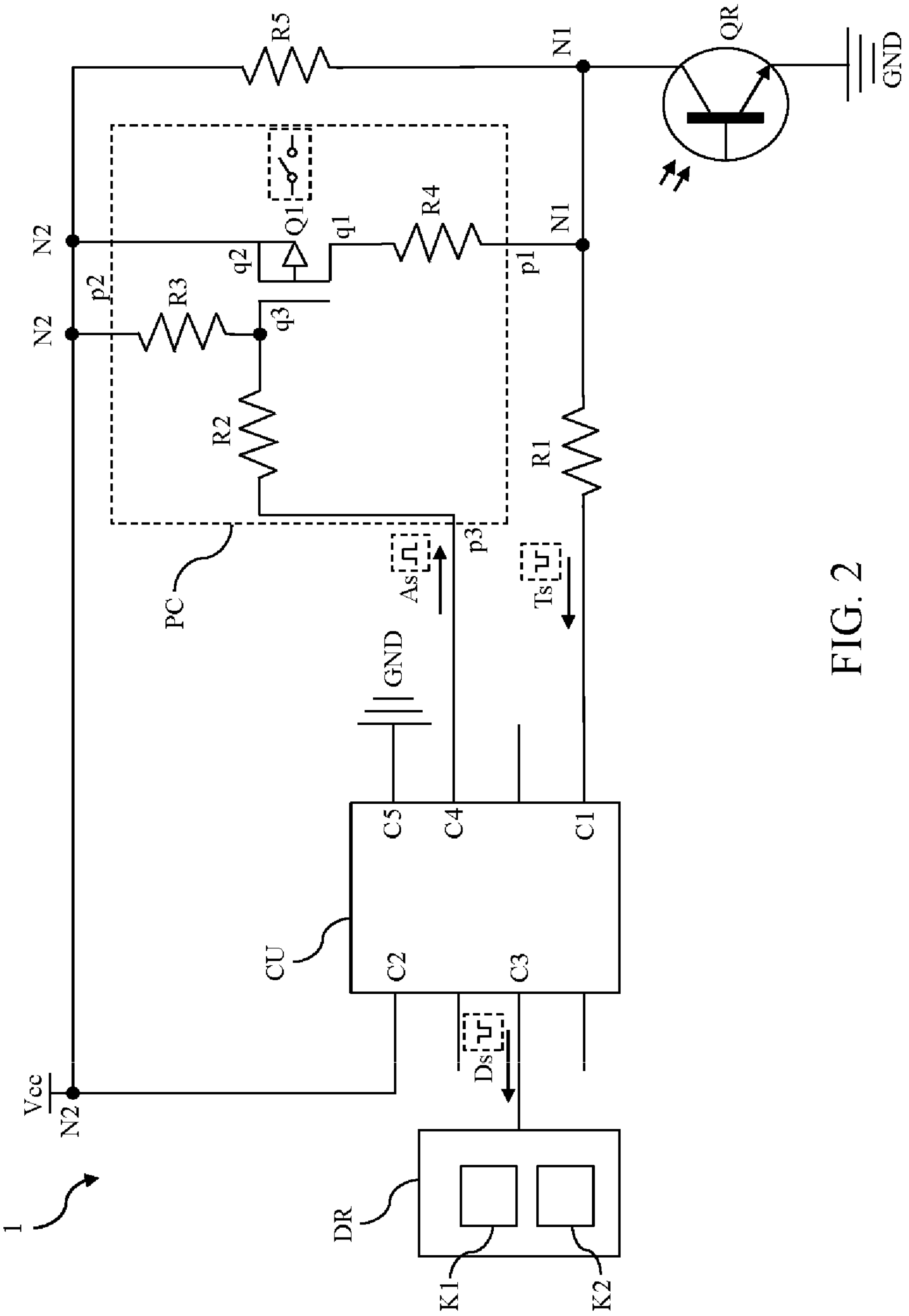
FIG. 2 is a first schematic view for illustrating an operational state of the lighting device having anti-interference circuit in accordance with one embodiment of the present invention.

Please refer to FIG. 2, which is a first schematic view for illustrating an operational state of the lighting device having anti-interference circuit in accordance with one embodiment of the present invention. As shown in FIG. 2, when the lighting device 1 is in a default state, the lighting device 1 does not need to emit light, so the lighting device 1 is in off state. At the moment, the driving circuit K2 of the light source driver DR does not drive the light source K1 (the light source K1 does not emit light).

When the lighting device 1 is in the default state, the driving signal output end C3 of the controller CU outputs the driving signal Ds to the light source driver DR. The level state of the driving signal Ds is level-low (less than 1.5V). The control signal output end C4 of the controller CU outputs the control signal As to the switch Q1. The level state of the control signal As is level-high in order to turn off the switch Q1. The first pull-up resistor R5 and the photosensitive element QR forms a light control detecting circuit in order to detect the brightness of the ambient light.

When the brightness of the ambient light is high, the photosensitive element QR is irradiated by enough light. At the moment, the internal resistance of the photosensitive element QR decreases, but the internal resistance of the first pull-up resistor R5 remains unchanged. When the potential of the upper end (the first node N1) of the photosensitive element QR is level-low, the detecting signal Ts received by the detecting signal input end C1 of the controller CU is level-low. Meanwhile, the driving signal output end C3 of the controller CU outputs driving signal Ds to the light source driver DR in order to turn off the light source driver DR (the driving circuit K2 of the light source driver DR does not drive the light source K1, so the light source K1 does not emit light). In addition, the control signal output end C4 of the controller CU outputs the high-level control signal As to the switch Q1 in order to turn off the switch Q1. When the switch Q1 is in off state, the first pull-up resistor R5 and the second pull-up resistor R4 are not connected to each other in parallel.

The embodiment just exemplifies the present invention and is not intended to limit the scope of the present invention; any equivalent modification and variation according to the spirit of the present invention is to be also included within the scope of the following claims and their equivalents.

Figure 3:
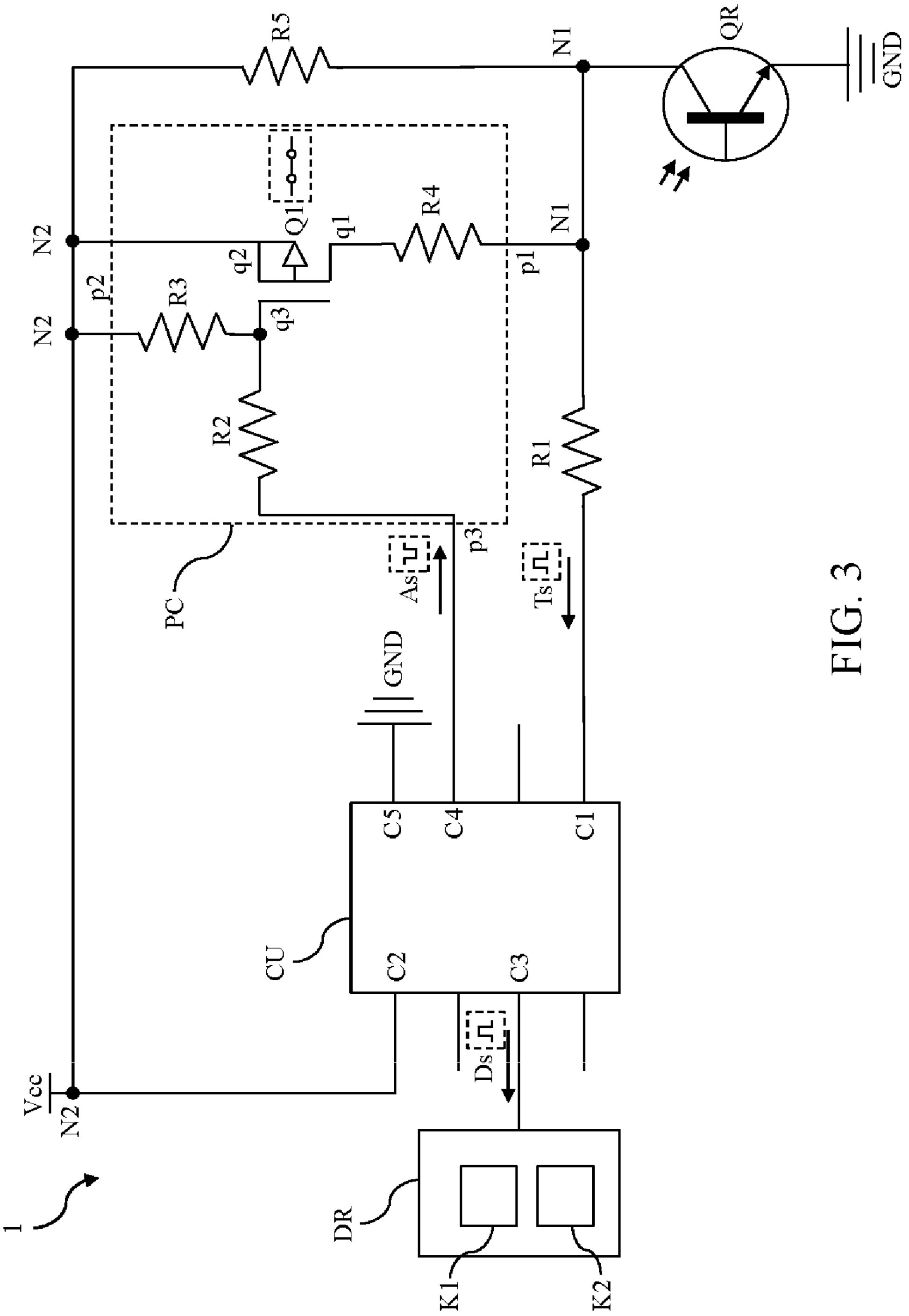
FIG. 3 is a second schematic view for illustrating another operational state of the lighting device having anti-interference circuit in accordance with one embodiment of the present invention.

Please refer to FIG. 3, which is a second schematic view for illustrating another operational state of the lighting device having anti-interference circuit in accordance with one embodiment of the present invention. As shown in FIG. 3, when the brightness of the ambient light decreases, the internal resistance of the photosensitive element QR increases and the internal resistance of the first pull-up resistor R5 remains unchanged. Thus, the voltage across the photosensitive element QR gradually increases to level-high, such that the detecting signal Ts received by the detecting signal input end C1 of the controller CU is level-high. At the moment, the driving signal output end C3 of the controller CU outputs high-level driving signal Ds to the light source driver DR in order to turn on the light source driver DR (the driving circuit K2 of the light source driver CU drives the light source K2 and then the light source K1 emits light). When the light source driver DR is turned on, the control signal output end C4 of the controller CU outputs the level-low control signal As to the switch Q1 in order to make the switch Q1 be in on state. When the switch Q1 is in on state, the first pull-up resistor R5 and the second pull-up resistor R4 are connected to each other in parallel, such that the total pull-up resistance of the photosensitive element QR decreases. Therefore, the upper end (the first node N1) of the photosensitive element QR can remain level-high by properly adjusting the value of R4/R5.

The light emitted by the light source K1 will be irradiated onto the photosensitive element QR after the light source driver QR is turned on, so the internal resistance of the photosensitive element QR decreases. Thus, if there is no the pull-up resistance adjusting mechanism provided by the pull-up resistance adjusting circuit PC, the detecting signal input end C1 of the controller CU will receive the level-low detecting signal Ts (because the internal resistance of the photosensitive element QR decreases). Thus, the driving signal output end C3 of the controller CU outputs the level-low driving signal Ds to turn off the light source driver DR. After the light source driver DR is turned off, the detecting signal input end C1 of the controller CU receives the level-high detecting signal again (because the internal resistance of the photosensitive element QR increases), such that the driving signal output end C3 of the controller CU outputs the high-level driving signal Ds again to turn on the light source driver DR. As a result, if there is no the pull-up resistance adjusting mechanism provided by the pull-up resistance adjusting circuit PC, the lighting device 1 tends to abnormally flicker or the brightness of the lighting device 1 tends to decrease due to self-interference.

The embodiment just exemplifies the present invention and is not intended to limit the scope of the present invention; any equivalent modification and variation according to the spirit of the present invention is to be also included within the scope of the following claims and their equivalents.

Figure 4:
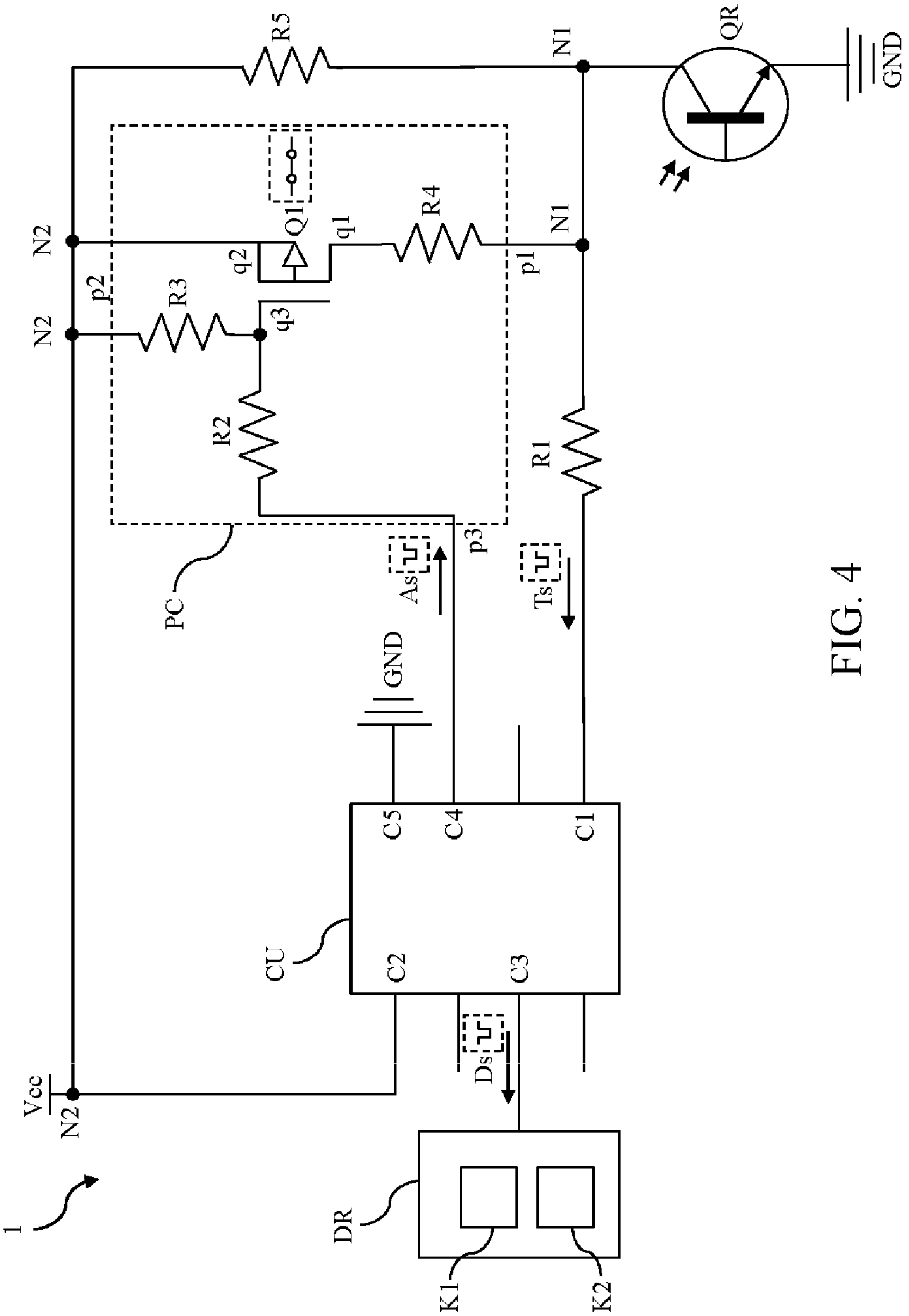
FIG. 4 is a third schematic view for illustrating still another operational state of the lighting device having anti-interference circuit in accordance with one embodiment of the present invention.

Please refer to FIG. 4, which is a third schematic view for illustrating still another operational state of the lighting device having anti-interference circuit in accordance with one embodiment of the present invention; please also refer to FIG. 2. As shown in FIG. 4, when the brightness of the ambient light keeps increasing, the ambient light and the light emitted by the light source K1 are simultaneously irradiated onto the photosensitive element QR, so the internal resistance of the photosensitive element QR keeps decreasing. When the internal resistance of the photosensitive element QR keeps decreasing to level-low during the parallel connection state of the first pull-up resistor R5 and the second pull-up resistor R4, the detecting signal input end C1 of the controller CU receives the level-low detecting signal Ts (because the internal resistance of the photosensitive element QR decreases). Accordingly, the driving signal output end C3 of the controller CU outputs the level-low driving signal Ds to turn off the light source driver DR.

As shown in FIG. 2, in the meanwhile, the control signal output end C4 of the controller CU outputs the level-high control signal As to the switch Q1 to turn off the switch Q1. In this way, the lighting device 1 returns to the default state shown in FIG. 2. At the moment, the first pull-up resistor R5 and the second pull-up resistor R4 are changed from the state of being connected in parallel to the state of not being connected in parallel. Then, the total pull-up resistance of the photosensitive element QR increases so as to further reduce the potential of the upper end (the first node N1) of the photosensitive element QR. The above mechanism can effectively avoid that the potential of the upper end (the first node N1) of the photosensitive element QR oscillates between high level and low level with a view to avoiding that the lighting device 1 abnormally flickers or the brightness of the lighting device 1 decreases.

As set forth above, the level state of the driving signal Ds outputted by the driving signal output end C3 is the same with that of the detecting signal Ts received by the detecting signal input end C1, but is contrary to the level state of the control signal As outputted by the control signal output end C4.

As described above, the lighting device 1 of this embodiment has a pull-up resistance adjusting circuit PC, which is connected to the controller CU, the first pull-up resistor R5, the photosensitive element QR and the current-limiting detecting resistor R1, which provides a special pull-up resistance adjusting mechanism. Thus, the light control circuit including the photosensitive element QR can have the pull-up resistance adjusting function, which can effectively prevent from the interference due to the change of the ambient light and self-interference. Accordingly, the above pull-up resistance adjusting mechanism can effectively avoid that the lighting device 1 abnormally flickers or the brightness of the lighting device 1 decreases. As a result, the performance of the lighting device 1 can be further optimized.

Moreover, the controller CU can further provide a time delay control mechanism in order to effectively reduce the interference due to the instant dramatic intensity change of the ambient light (e.g., a headlight, flashlight, lightning, etc.). For instance, when the light source driver DR is in on state, the photosensitive element QR detects the instant dramatic intensity change of the ambient light and then the upper end of the photosensitive element QR is changed from high level to low level. At the moment, the detecting signal input end C1 of the controller CU receives the level-low detecting signal Ts of the detecting signal input end C1, but the driving signal output end C3 of the controller CU will not immediately output the level-low driving signal Ds to the light source driver DR. In this case, the controller CU detects the detecting signal Ts of the detecting signal input end C1 thereof again after a default time delay (e.g., 5 seconds, 10 seconds . . . ). If the default time delay passes, the controller CU determines that the detecting signal Ts of the detecting signal input end C1 thereof is still level-low, the driving signal output end C3 of the controller CU outputs the level-low driving signal Ds to the light source driver DR in order to turn off the light source driver DR. On the contrary, if the default time delay passes, the controller CU determines that the detecting signal Ts of the detecting signal input end C1 thereof is level-high, the light source driver DR keeps being in on state.

As set forth above, the controller CU can further provide the time delay control mechanism. The combination of the pull-up resistance adjusting mechanism and the time delay control mechanism can effectively decrease the interference caused by the instant dramatic intensity change of the ambient light. Therefore, the lighting device 1 can stably output light, such that the performance of the lighting device 1 can be significantly enhanced.

The embodiment just exemplifies the present invention and is not intended to limit the scope of the present invention; any equivalent modification and variation according to the spirit of the present invention is to be also included within the scope of the following claims and their equivalents.

It is worthy to point out that currently available lighting devices still have many shortcomings that need to be improved. For example, if the light emitted by the light source is directly irradiated onto the photosensitive component, self-interference may be occurred, which causes the light emitted by the light source to flicker abnormally or reduce the brightness of the light source. In addition, when several lighting devices are turned on at the same time and the photosensitive component of one of the lighting devices is illuminated by the light source of another lighting device, self-interference may be also incurred, which influences the application range of these lighting devices. On the contrary, according to one embodiment of the present invention, the lighting device has a pull-up resistance adjusting circuit connected to a controller, a first pull-up resistor, a photosensitive element and a current-limiting detecting resistor, which provides a special pull-up resistance adjusting mechanism. Thus, the light control circuit including the photosensitive element has the pull-up resistance adjusting function, which can effectively reduce the interference due to the change of the ambient light and prevent from self-interference. The above pull-up resistance adjusting mechanism can effectively avoid that the lighting device abnormally flickers or the brightness of the lighting device decreases, such that the performance of the lighting device can be optimized.

Also, according to one embodiment of the present invention, the lighting device has the pull-up resistance adjusting circuit, which can provide the special pull-up resistance adjusting mechanism. Besides, the controller can further provide a time delay control mechanism. The combination of the pull-up resistance adjusting mechanism and the time delay control mechanism can effectively decrease the interference caused by the instant dramatic intensity change of the ambient light. Therefore, the lighting device can stably output light, such that the performance of the lighting device can be significantly enhanced. Accordingly, the lighting device can conform to actual requirements.

Further, according to one embodiment of the present invention, the lighting device can effectively integrate the above pull-up resistance adjusting mechanism and time delay control mechanism. Thus, the lighting device can effectively decrease the interference caused by the instant dramatic intensity change of the ambient light. Accordingly, the lighting device can provide stable light output, such that the performance of the lighting device can be significantly improved. As a result, the lighting device can satisfy actual requirements.

Moreover, according to one embodiment of the present invention, the pull-up resistance adjusting mechanism and time delay control mechanism of the lighting device can be applied to various currently available lighting devices having the light control function so as to control to the requirements of different environments. Thus, the lighting device can definitely meet the requirements of different applications.

Furthermore, according to one embodiment of the present invention, the light control circuit of the lighting device can achieve the aforementioned pull-up resistance adjusting mechanism and time delay control mechanism via a simple circuit design. Thus, the lighting device can achieve the desired technical effects without significantly increasing the cost thereof. Thus, the market competitiveness of the lighting device can be greatly enhanced, such that the lighting device can have high commercial value. As set forth above, the lighting device having anti-interference light control circuit according to the embodiments of the present invention can definitely achieve great technical effects.

Figure 5:
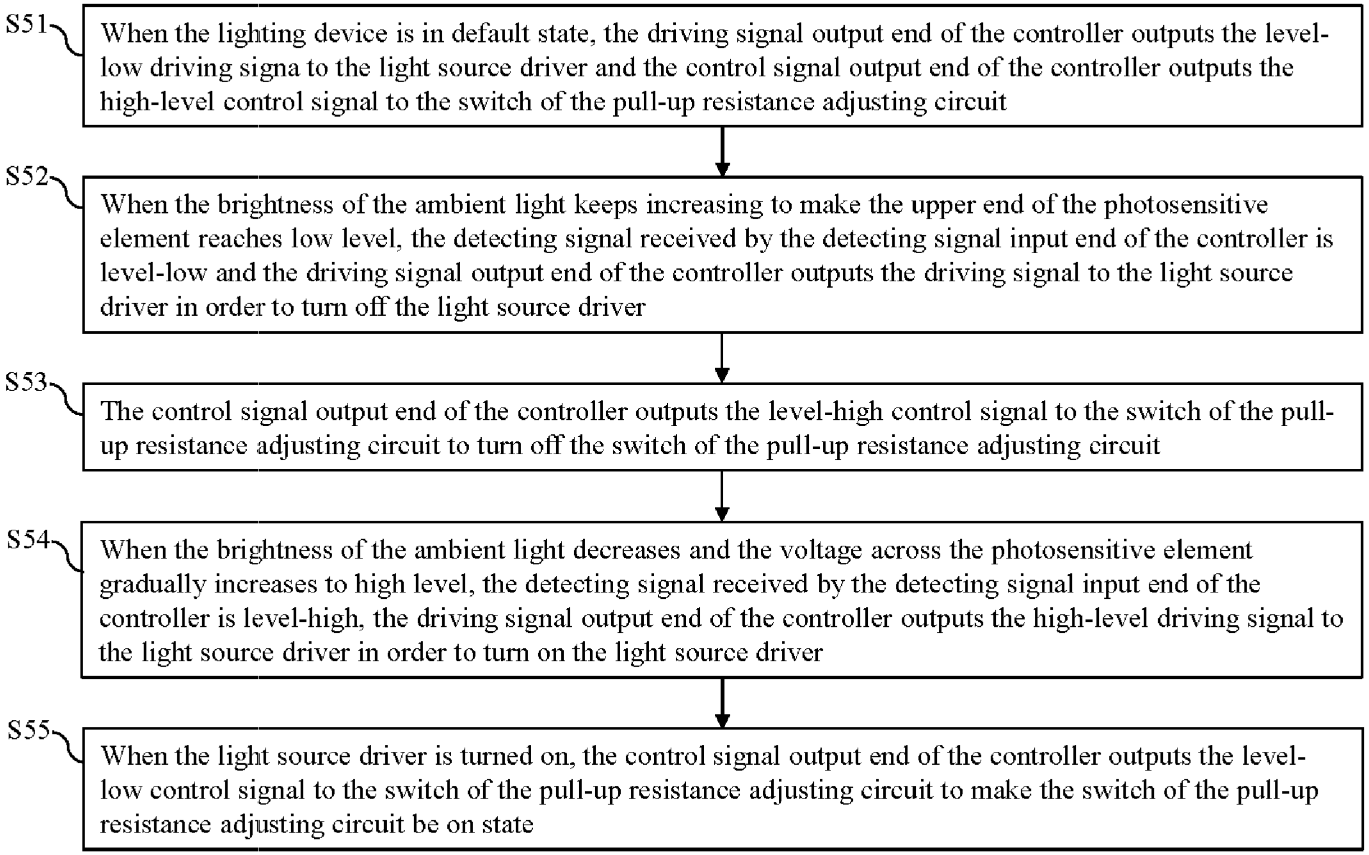
FIG. 5 is a flow chart of a control method for controlling the lighting device having anti-interference circuit in accordance with one embodiment of the present invention.

Please refer to FIG. 5, which is a flow chart of a control method for controlling the lighting device having anti-interference circuit in accordance with one embodiment of the present invention. As shown in FIG. 5, the control method of the lighting device 1 according to the embodiment of the present invention includes the following steps:

Step S51: when the lighting device is in default state, the driving signal output end of the controller outputs the level-low driving signal to the light source driver and the control signal output end of the controller outputs the high-level control signal to the switch of the pull-up resistance adjusting circuit.

Step S52: when the brightness of the ambient light keeps increasing to make the upper end of the photosensitive element reaches low level, the detecting signal received by the detecting signal input end of the controller is level-low and the driving signal output end of the controller outputs the driving signal to the light source driver in order to turn off the light source driver.

Step S53: the control signal output end of the controller outputs the level-high control signal to the switch of the pull-up resistance adjusting circuit to turn off the switch of the pull-up resistance adjusting circuit.

Step S54: when the brightness of the ambient light decreases and the voltage across the photosensitive element gradually increases to high level, the detecting signal received by the detecting signal input end of the controller is level-high, the driving signal output end of the controller outputs the high-level driving signal to the light source driver in order to turn on the light source driver.

Step S55: when the light source driver is turned on, the control signal output end of the controller outputs the level-low control signal to the switch of the pull-up resistance adjusting circuit to make the switch of the pull-up resistance adjusting circuit be on state.

The control method of the lighting device 1 according to this embodiment provides the special pull-up resistance adjusting mechanism. Therefore, the light control circuit including the photosensitive element QR has the pull-up resistance adjusting function, which can effectively reduce the interference due to the change of the ambient light and prevent from self-interference. The above pull-up resistance adjusting mechanism can effectively avoid that the lighting device 1 abnormally flickers or the brightness of the lighting device 1 decreases, such that the performance of the lighting device 1 can be optimized.

In addition, the above method can also include the aforementioned time delay control mechanism. The combination of the pull-up resistance adjusting mechanism and the time delay control mechanism can effectively decrease the interference caused by the instant dramatic intensity change of the ambient light. Therefore, the lighting device 1 can stably output light, such that the performance of the lighting device 1 can be significantly enhanced.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the lighting device has a pull-up resistance adjusting circuit connected to a controller, a first pull-up resistor, a photosensitive element and a current-limiting detecting resistor, which provides a special pull-up resistance adjusting mechanism. Thus, the light control circuit including the photosensitive element has the pull-up resistance adjusting function, which can effectively reduce the interference due to the change of the ambient light and prevent from self-interference. The above pull-up resistance adjusting mechanism can effectively avoid that the lighting device abnormally flickers or the brightness of the lighting device decreases, such that the performance of the lighting device can be optimized.

Also, according to one embodiment of the present invention, the lighting device has the pull-up resistance adjusting circuit, which can provide the special pull-up resistance adjusting mechanism. Besides, the controller can further provide a time delay control mechanism. The combination of the pull-up resistance adjusting mechanism and the time delay control mechanism can effectively decrease the interference caused by the instant dramatic intensity change of the ambient light. Therefore, the lighting device can stably output light, such that the performance of the lighting device can be significantly enhanced. Accordingly, the lighting device can conform to actual requirements.

Further, according to one embodiment of the present invention, the lighting device can effectively integrate the above pull-up resistance adjusting mechanism and time delay control mechanism. Thus, the lighting device can effectively decrease the interference caused by the instant dramatic intensity change of the ambient light. Accordingly, the lighting device can provide stable light output, such that the performance of the lighting device can be significantly improved. As a result, the lighting device can satisfy actual requirements.

Moreover, according to one embodiment of the present invention, the pull-up resistance adjusting mechanism and time delay control mechanism of the lighting device can be applied to various currently available lighting devices having the light control function so as to control to the requirements of different environments. Thus, the lighting device can definitely meet the requirements of different applications.

Furthermore, according to one embodiment of the present invention, the light control circuit of the lighting device can achieve the aforementioned pull-up resistance adjusting mechanism and time delay control mechanism via a simple circuit design. Thus, the lighting device can achieve the desired technical effects without significantly increasing the cost thereof. Thus, the market competitiveness of the lighting device can be greatly enhanced, such that the lighting device can have high commercial value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device having anti-interference light control circuit, comprising:

a photosensitive element, wherein one end thereof is connected to a first node and another end thereof is connected to a grounding point;

a first pull-up resistor, wherein one end thereof is connected to the first node and another end thereof is connected to a second node, and the second node is connected to an operating voltage source;

a light source driver;

a current-limiting detecting resistor;

a controller having a detecting signal input end, a voltage input end, a driving signal output end and a control signal output end, wherein the detecting signal input end is connected to the first node via the current-limiting detecting resistor and the voltage input end is connected to the second node and the driving signal output end is connected to the light source driver; and a pull-up resistance adjusting circuit, wherein a first end thereof is connected to the first node, the second end thereof is connected to the second node, and a third end thereof is connected to the control signal output end.

2. The lighting device having anti-interference light control circuit as claimed in claim 1, wherein the detecting signal input end receives a detecting signal, the driving signal output end outputs a driving signal, and the control signal output end outputs a control signal, wherein a level state of the driving signal is equal to a level state of the detecting signal and is contrary to a level state of the control signal.

3. The lighting device having anti-interference light control circuit as claimed in claim 1, wherein the pull-up resistance adjusting circuit comprises a second pull-up resistor, a third pull-up resistor, a driving control current-limiting resistor and a switch, wherein a first end of the switch is connected to the first node via the second pull-up resistor, a second end of the switch is connected to the second node, and a third end of the switch is connected to the control signal output end and the second node via the driving control current-limiting resistor and the third pull-up resistor.

4. The lighting device having anti-interference light control circuit as claimed in claim 3, wherein the first pull-up resistor and the second pull-up resistor are connected to each other in parallel.

5. The lighting device having anti-interference light control circuit as claimed in claim 3, wherein the first pull-up resistor and the second pull-up resistor are not connected to each other in parallel.

6. The lighting device having anti-interference light control circuit as claimed in claim 1, wherein the switch is a bipolar junction transistor or a metal-oxide-semiconductor field-effect transistor.

7. The lighting device having anti-interference light control circuit as claimed in claim 1, wherein the controller further has a grounding end connected to the grounding point.

8. The lighting device having anti-interference light control circuit as claimed in claim 1, wherein the controller is a microcontroller unit, a central-processing unit, an application specific integrated circuit and a field programmable gate array.

9. The lighting device having anti-interference light control circuit as claimed in claim 1, wherein the light source driver comprises a light source and a driving circuit.

10. The lighting device having anti-interference light control circuit as claimed in claim 9, wherein the light source is a light-emitting diode.

* * * * *